(12) United States Patent
Hubbard et al.

(10) Patent No.: US 8,696,212 B2
(45) Date of Patent: Apr. 15, 2014

(54) ROLLER BEARING BACKING RING ASSEMBLY

(75) Inventors: Paul Hubbard, South Chesterfield, VA (US); Michael A Mason, Richmond, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 35 days.

(21) Appl. No.: 13/409,293

(22) Filed: Mar. 1, 2012

(65) Prior Publication Data

US 2013/0230265 A1  Sep. 5, 2013

(51) Int. Cl.
*F16C 33/78* (2006.01)
*F16C 33/76* (2006.01)
*B61F 15/22* (2006.01)

(52) U.S. Cl.
USPC .............................. 384/482; 384/459; 384/489

(58) Field of Classification Search
USPC ......... 384/450, 559, 490, 504, 547, 584–589, 384/459, 482, 489
See application file for complete search history.

(56) References Cited

U.S. PATENT DOCUMENTS

| | | | | | |
|---|---|---|---|---|---|
| 3,833,277 | A | * | 9/1974 | Jones et al. | 384/459 |
| 3,913,992 | A | * | 10/1975 | Scott et al. | 384/465 |
| 4,235,485 | A | * | 11/1980 | Reiter | 384/450 |
| 4,260,387 | A | * | 4/1981 | Muellenberg | 403/359.1 |
| 4,692,040 | A | * | 9/1987 | Ebaugh et al. | 384/484 |
| 4,938,615 | A | * | 7/1990 | Baker | 384/571 |
| 5,380,102 | A | * | 1/1995 | Sink | 384/484 |
| 5,440,184 | A | * | 8/1995 | Samy et al. | 310/90 |
| 5,794,538 | A | * | 8/1998 | Pitchford | 105/218.1 |
| 6,312,161 | B1 | * | 11/2001 | Williams | 384/459 |
| 6,561,559 | B1 | * | 5/2003 | Skiller et al. | 295/36.1 |
| 7,419,306 | B2 | * | 9/2008 | Miki et al. | 384/477 |
| 7,578,061 | B2 | * | 8/2009 | Guempel et al. | 29/898.09 |
| 7,607,836 | B2 | * | 10/2009 | Mason et al. | 384/480 |
| 7,845,856 | B2 | * | 12/2010 | Shimizu et al. | 384/477 |

* cited by examiner

*Primary Examiner* — Marcus Charles
(74) *Attorney, Agent, or Firm* — Edward J. Brosius (57) ABSTRACT

A novel assembly for a railcar axle bearing is presented. The assembly includes a backing ring affixed to the fillet of the journal of an axle and a locking ring for further affixing the backing ring the journal. The locking ring has an inboard end affixed to the dust guard of the axle and an outboard end for engaging the backing ring. The looking ring may include a resilient sealing ring.

2 Claims, 7 Drawing Sheets

ROLLER BEARING BACKING RING ASSEMBLY

FIELD OF THE INVENTION

This invention relates to roller bearings, and more particularly, to tapered roller bearings fitted on railway freight car axles.

BACKGROUND OF THE INVENTION

Tapered roller bearings on railcar axles support operating loads capable of producing flexural deflections in the axle, and in particular, the end portion of the axle comprising the journal on which the tapered roller bearing is affixed. The stresses imposed by the operating loads are particularly high in the journal portion of the shaft at or near the backing ring.

As result of shaft deflections, the backing ring and the journal can experience fretting wear as the backing ring moves relative to the journal. Fretting wear may be sufficient to loosen the backing ring, increasing the axial play of the bearing on the journal. The loose backing ring accelerates wear on the bearing assembly and journal, potentially leading to shaft or bearing failure.

The backing ring design is a single piece component having an angled section engaging the dust guard portion of the axle.

SUMMARY OF THE INVENTION

To reduce the potential for fretting wear on journals and backing rings, an assembly is presented having increased stability to reduce fretting wear. The assembly is composed of two components: (1) a backing ring fitted on the journal and (2) a locking ring to connect with and further affix the backing ring on the journal. The locking ring has an lateral outer end engaging the backing ring and an lateral inner end adjacent to the outer diameter of the dust guard portion of the axle. The locking ring reduces axial movement in the backing ring resulting from axle deflection.

DETAILED DESCRIPTION

Figure 1:
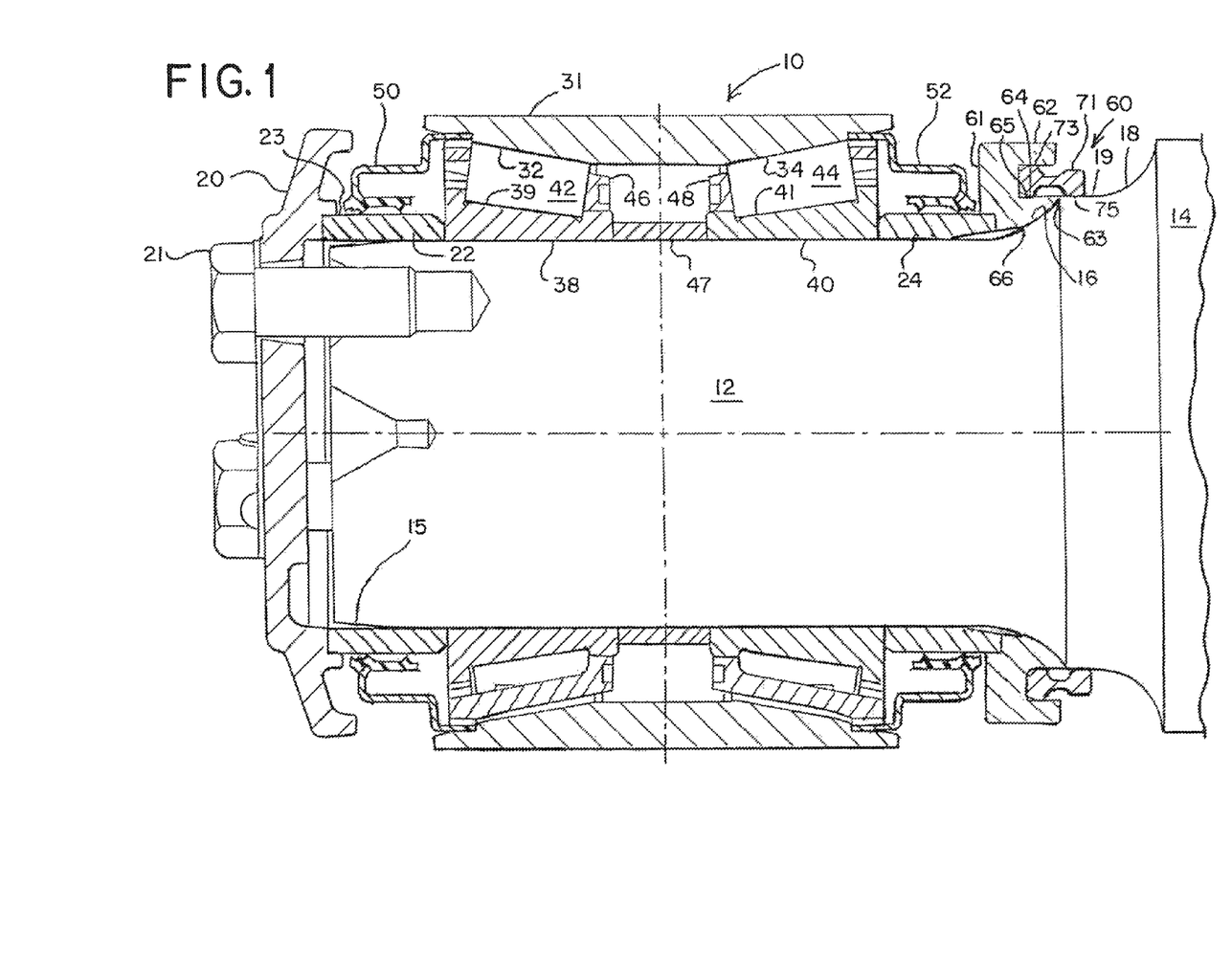
FIG. 1 is a sectional view of a first embodiment of the backing ring assembly of the present invention.

Referring to FIG. 1, a first embodiment of the backing ring assembly of the present invention is shown. In this embodiment, the bearing assembly 10 is a tapered roller bearing of the type commonly used in railway applications to support a railcar wheel on an axle.

The bearing assembly 10 is typically preassembled before being mounted on railcar axle 14. At each free end of the axle 14, a journal 12 terminates in a slightly conical tapered section 15 to facilitate installation of the bearing assembly 10 onto the journal. The bearing assembly 10 is pressed onto the journal 12 of the axle 14 to establish an interference fit.

A dust guard 18 with a larger diameter than the journal 12 is located axially inward from the journal 12. Axially inward from the dust guard 18, the shaft 14 extends to its largest diameter. The weight of the railcar is transferred through the bearing assembly 10 to the shaft and further transferred to the rails through the railcar wheels (not shown) fitted inboard of the dust guard on the shaft.

Some bearing assemblies 10 have wear rings 22, 24 fitted over the journal 12 and which abut each end of the bearing assembly 10. The wear rings 22, 24 typically have an inner diameter dimension to provide an interference fit with the journal 12 over at least a portion of their length. The wear rings 22, 24 rotate with the shaft as it turns.

Although the bearing assembly 10 is pressed onto the journal 12, further restraint is generally required against axial loads. To provide this axial restraint, the bearing assembly 10 is captured between a backing ring assembly 60 at the lateral inboard side and a bearing retaining cap 20 at the lateral outboard side of the bearing assembly 10.

Figure 2:
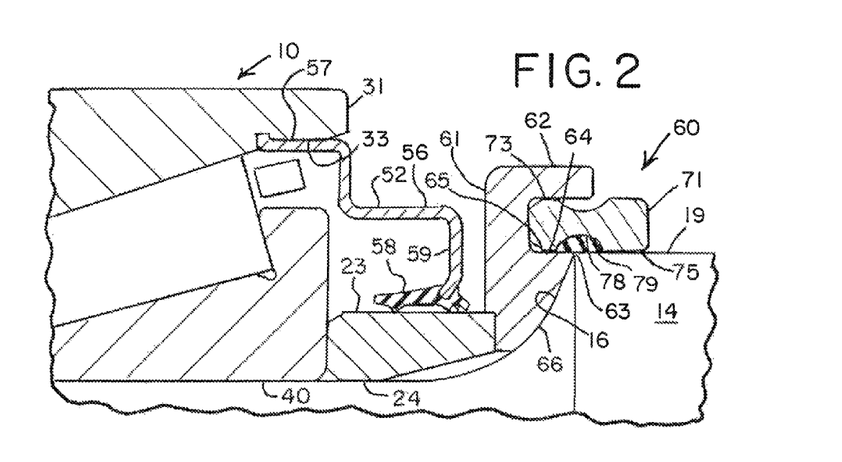
FIG. 2 is an enlarged sectional view of the first embodiment of the backing ring assembly of the present invention.

Referring now to FIG. 2 as well, at the inboard side of the journal 12 portion of axle 14, the bearing assembly 10 is captured by backing ring 61 through abutting wear ring 24. Backing ring 61 has an inner contoured surface 66 allowing a tight surface fit with a complementary surface on the fillet 16 on the inboard end of the journal 12. The fillet 16 leads to a shoulder, the shoulder extending to form a dust guard 18 having a cylindrical surface 19. Backing ring 61 has an inboard distal edge 63 at the contoured surface 66, generally abutting fillet 16. Backing ring 61 includes a radially outer section 62 and a radially inner section 64 that together form a cutout section 65.

Locking ring 71 has a lateral inner end 75 adjacent to the cylindrical surface 19 of dust guard 18. Locking ring lateral outer end 73 fits in cutout section 65 of backing ring 61 and restrains backing ring 61 against deflection and axial displacement. Backing ring 61 and locking ring 71 together form the backing ring assembly 60. Locking ring 71, the furthest inboard component affixed to the journal 12, affixes the bearing assembly 10 against axially inward displacement.

At the outboard end of the journal, the bearing assembly 10 is captured by the bearing retaining cap 20 through the interposed and abutting outboard wear ring 22. Bearing retaining cap 20 is affixed to the free end of journal 12 with cap screws or bolts 21 threaded into a plurality of threaded bores. Bearing retaining cap 20 completes the mounting of the bearing assembly 10 onto the journal 12, providing a clamping force to restrain the bearing assembly against axially outward displacement.

The bearing assembly 10 is preassembled from a number of individual components, including two cylindrical bearing cones 38, 40 and a cylindrical bearing cup 31. Bearing cup 31 has an inner surface having radially inward directed outer raceway's 32, 34. The bearing cones 38, 40 have radially outward directed inner raceways 39, 41. A center spacer 47 is positioned between the bearing cones 38, 40 to maintain the cones in accurately spaced position relative to each other and allow for proper bearing lateral clearance. The outer raceways 32, 34 in the bearing cup 31 cooperate with the inner raceways 39, 41 in the bearing cones 38, 40 to capture and support two rows of the tapered rollers 42, 44. In some embodiments, cages 46, 48 maintain the circumferential spatial positioning of the rollers 42, 44.

Bearing seals 50, 52 cover the ends of the bearing assembly 10 to minimize both lubricant leakage from the bearing and intrusion of contaminants into the bearing. In a first embodiment, the bearing seals 50, 52 are affixed to the stationary (i.e., non-rotating) side of the bearing assembly 10 (such as the bearing cup 31) by interference fit or other appropriate method.

A seal body 56 (typically of a generally cylindrical elastomeric construction) is part of bearing seal 50, 52 to form a dynamic seal between stationary and moving bearing assembly components. In one embodiment, the seal body 56 is urged against the wear ring 22, 24 to seat the bearing assembly 10. A first radial edge 57 of seal body 56 is received against an inner radial surface 33 of bearing cup 31. A second radial edge 59 of seal body 56 extends radially inward and has a resilient seal 58 attached thereto. Resilient seal 58 contacts outer radial surface 23 of wear ring 24.

Cylindrical wear rings 22, 24 protect the journal 12 against rubbing wear from the seal body by providing a wear surface 23, Referring to FIG. 2, the backing ring assembly 60 of FIG. 1 is illustrated in an enlarged sectional view. Backing ring 61 has an inner contoured surface 66 adjacent the journal 12 at the complementary surface of the fillet 16.

A slot or cutout section 65 in the axially inward directed surface of backing ring 61 receives the laterally outer end 73 of locking ring 71.

A resilient sealing ring 79 is present in an indented section 78 of locking ring 71. Resilient sealing ring 79 contacts and forms a seal with cylindrical surface 19 of dust guard 18 of axle 14. Resilient sealing ring 79 may also contact and form a seal with radially inner section 64 of backing ring 61. Resilient sealing ring 79 is typically comprised of a polymer such as polypropylene.

Locking ring 71, with its connection between backing ring 61 and the cylindrical surface 19 of the dust guard 18, reinforces and anchors backing ring 61 against axial displacement and deflection. It is believed that the flexibility of the locking ring 71 allows backing ring 61 to more readily move with the deflection of the journal 12, yet, still allow locking ring 71 to restrain the axial displacement of backing ring 61.

Figure 3:
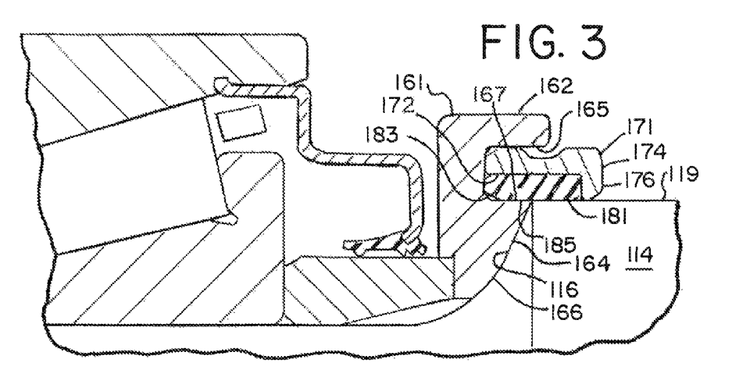
FIG. 3 is an enlarged sectional view of a second embodiment of the backing ring assembly of the present invention.

Referring now to FIG. 3, second embodiment of the backing ring assembly of the present invention is shown. Components with identical reference numerals to FIGS. 1 and 2 will not be described.

Referring now to FIG. 3, a second embodiment of the backing ring assembly is shown. Backing ring 161 is shown as a generally cylindrical, ring shape structure having a radially outer section 162 and a radially inner section 164 that together form a cutout section 165. Backing ring 161 further comprises a laterally inwardly curved face 166 which is adjacent fillet 116 of axle shaft 114. Locking ring 171 is seen as a cylindrical ring shaped structure having a laterally inner end 174 and a laterally outer end 172. Laterally outer end 172 is received into inwardly facing cutout section 165 of backing ring 161. Laterally inward end 174 of locking ring 171 is seen to include an inner radially facing 176 surface that is adjacent axle cylindrical surface 119. Resilient ring 181 is adjacent locking ring 171 and also has a lateral outer end 183 fit in cutout section 165. Resilient ring 181 has a radial inner surface 185 that is adjacent to surface 167 of backing ring 161 and axle cylindrical surface 119. Backing ring 161 and locking ring 171 are typically comprised of steel, and resilient ring 181 is comprised of a suitable polymer such as polypropylene.

Figure 4:
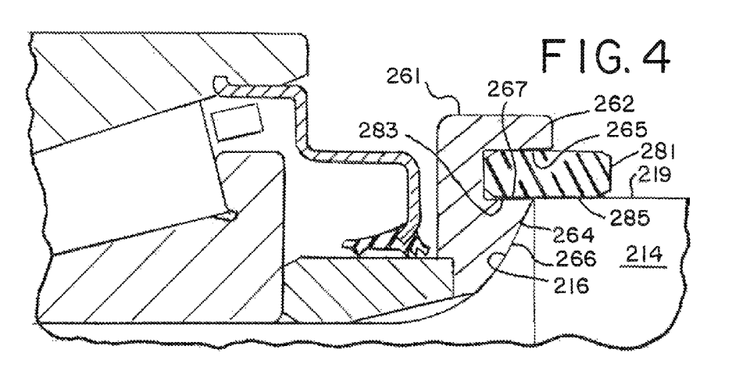
FIG. 4 is an enlarged sectional view of the third embodiment of the backing ring assembly of the present invention.

Referring now to FIG. 4, a third embodiment of the backing ring assembly of the present invention is shown. Components with identical reference numerals to FIGS. 1 and 2 will not be described.

Backing ring 261 is shown as a generally cylindrical, ring shape structure having a radially outer section 262 and a radially inner section 264 that together form cutout section 265. Backing ring 261 further comprises a laterally inward curved face 266 which is adjacent fillet 216 of axle shaft 214. Resilient ring 281 is adjacent to axle surface 219 and has a lateral outer end 283 fit in cutout section 265. Resilient ring has a radial inner surface 285 that is adjacent to surface 267 of backing ring 261 and axle cylindrical surface 219. Backing ring 261 is typically comprised of steel, and resilient ring 281 is comprised of a suitable polymer such as polypropylene.

Figure 5:
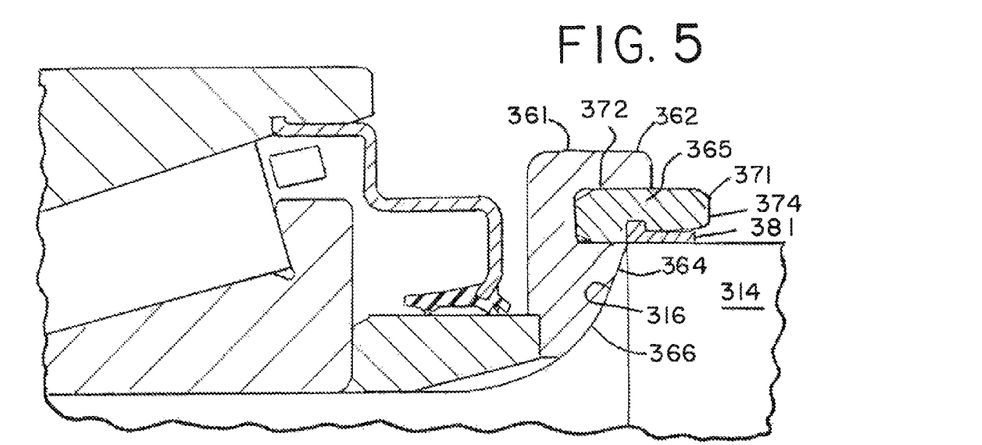
FIG. 5 is an enlarged sectional view of a fourth embodiment of the backing ring assembly of the present invention.

Referring now to FIG. 5, a fourth embodiment of the backing ring assembly of the present invention is set forth. Components with identical reference numerals to FIGS. 1 and 2 will not be described.

Backing ring 361 is shown as a generally cylindrical, ring shape structure having a radially outer section 362 and a radially inner section 364 that together form a cutout section 365. Backing ring 361 further comprises a laterally inward curved face 366 which is adjacent fillet 316 of axle shaft 314. Locking ring 371 is seen as a cylindrical ring shape structure having a laterally inward end 374 and a laterally outer end 372. Laterally outer end 372 is received in corresponding radial inward facing cutout 365 of backing ring 361. Laterally inward end 374 of locking ring 371 is seen to have a reduced diameter. Backing ring 361 and locking ring 371 are typically comprised of steel, and resilient ring 381 is typically comprised of a suitable polymer such as polypropylene.

Figure 6:
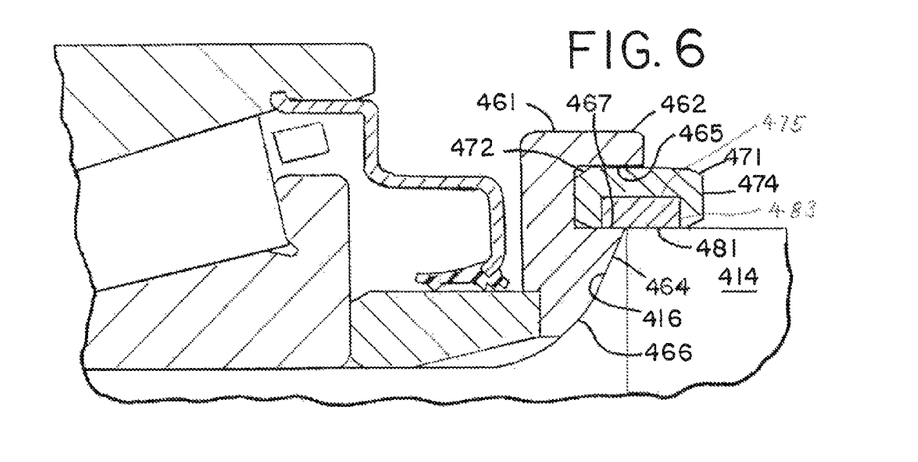
FIG. 6 is an enlarged sectional view of a fifth embodiment of the backing ring assembly of the present invention.

Referring now to FIG. 6, a fifth embodiment of the present invention is shown. Components with identical reference numerals to FIGS. 1 and 2 will not be described.

Backing ring 461 is shown generally cylindrical, ring shape structure having a radially outer section 462 and a radially inner section 464 that together form cutout section 465. Backing ring 461 is seen to have a curved section 466 which is adjacent fillet section 416 of axle 414. Locking ring 471 is seen to comprise a generally cylindrical ring shaped structure having an laterally inward facing end 474 and a laterally outer facing end 472. Locking ring laterally outward facing end extends into cutout section 465. Laterally outward facing end 472 and laterally inward facing end form a recess 475 there between. Resilient ring 481 is located in recess 475. Resilient ring 481 includes a radial inward surface 483 that engages axle 414 and surface 467 of backing ring 461. Backing ring 461 and locking ring 471 are typically comprised of steel and resilient ring 481 is typically comprised of a polymer such as polypropylene.

Figure 7:
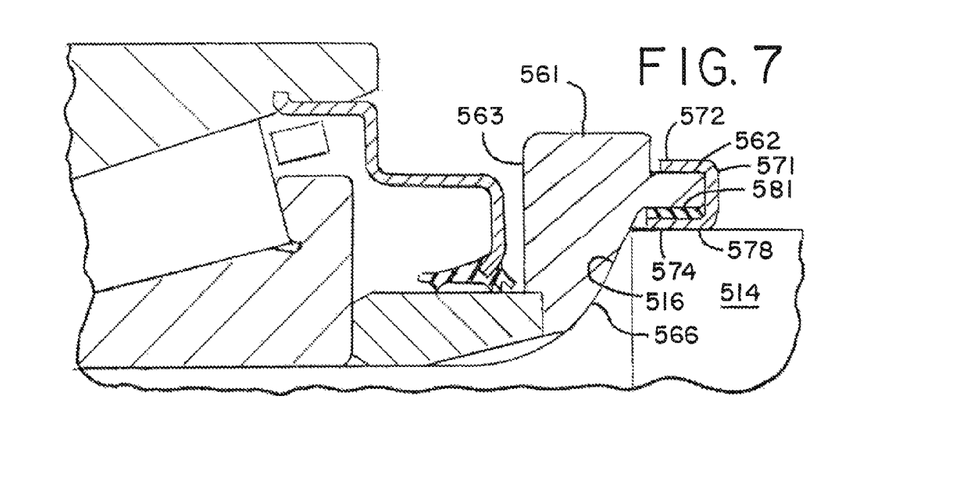
FIG. 7 is an enlarged sectional view of a sixth embodiment of the backing ring assembly of the present invention.

Referring now to FIG. 7, a sixth embodiment of the backing ring assembly of the present invention is shown. Components with identical reference numerals to FIGS. 1 and 2 will not be described.

Backing ring 561 is seen to comprise a generally cylindrical ring shaped structure having a laterally outward facing wall 563. Backing ring 561 is also seen to comprise a curved section 566 which is adjacent curved fillet 516 of axle 514. Backing ring 561 is also seen to comprise a lateral inward extending section 562.

Locking ring 571 is seen to comprise a ring shaped structure with a radial outer section 572 and a radial inward section 574. Radial inward section 574 includes a radially inward surface 578 that is adjacent axle cylindrical surface 514. Resilient ring 581 is located between radial inward section 574 of locking ring 571 and lateral inward extending section 562 of backing ring 561. Backing ring 561 and locking ring 571 are typically comprised of steel, and resilient ring 581 is typically comprised of a suitable polymer such as polypropylene.

Figure 8:
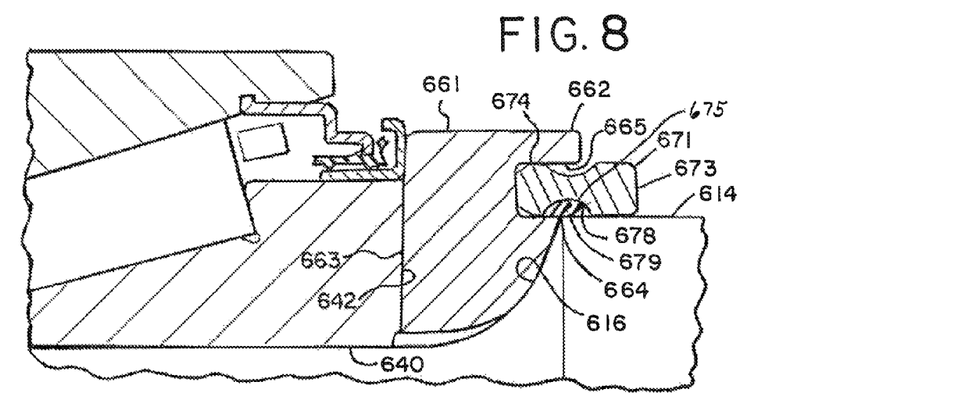
FIG. 8 is an enlarged sectional view of a seventh embodiment of the backing ring assembly of the present invention.

Referring now to FIG. 8, a seventh embodiment of the present invention is shown. Backing ring 661 is seen to include a generally cylindrical, ring shaped structure having an laterally outer facing flat surface 663 which is adjacent a laterally inward facing generally flat surface 642 of bearing cone 640. Backing ring 661 also is seen to include a curved surface 666 which is adjacent fillet 616 of axle 614. Backing ring 661 also has a radially outer section 662 and a radially inner section 664 that together form cutout section 665.

Locking ring 671 is seen to comprise a laterally outer end 674. Laterally outer end 674 is fit in cutout section 665 of backing ring 661. Locking ring cutout section 675 is seen to comprise a radially inner facing recess 678 which is adjacent radially inner section 664 of backing ring 661 forming cutout section 665. A resilient ring 679 is received in recess 678 and contacts a surface of radially inner section 664 of backing ring 661 and axle section 614. Backing ring 661 and locking ring 671 are typically comprised of steel, and resilient ring 679 is typically comprised of a polymer such as polypropylene.

Figure 9:
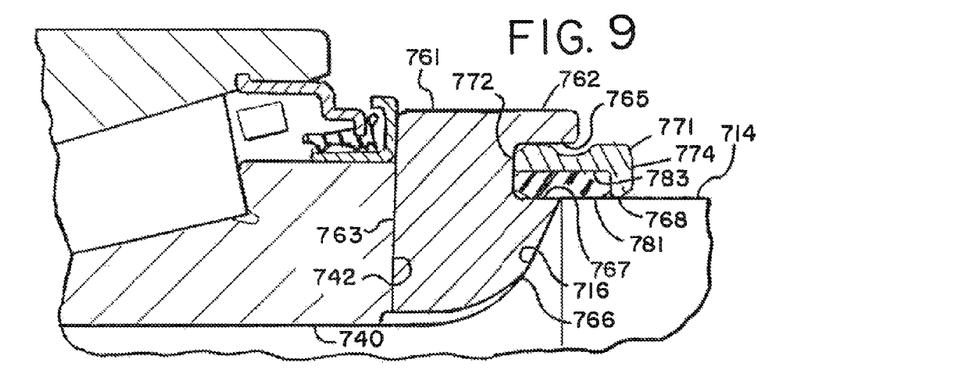
FIG. 9 is an enlarged sectional view of an eighth embodiment of the backing ring assembly of the present invention.

Referring now to FIG. 9, an eighth embodiment of the backing ring assembly of the present invention is shown. Components with identical reference numerals to FIGS. 1 and 2 will not be described.

Backing ring 761 is seen to comprise a generally cylindrical, ring structure. Backing ring 761 includes a laterally outward facing flat face 763 which is adjacent laterally inward facing flat face 742 of bearing cone 740. Backing ring 761 also includes a curved generally inwardly facing surface 766 which is adjacent complementary generally curved fillet 716 of axle 714. Backing ring 761 is also seen to include a radially outward edge 762 which forms, with radial surface 767, cutout section 765 of backing ring 761.

Locking ring 771 is seen to comprise a generally cylindrical ring like structure having laterally inward end 774. Laterally inward end 774 is seen to include surface 768 engaging cylindrical surface axle 714. Locking ring 771 is also seen to comprise a laterally outward end 772 which includes fits in cutout section 765 of backing ring 761. Resilient ring 781 is it in a recessed section 783 in locking ring 771. Resilient ring 781 includes a radial inner surface that engages radial surface 767 of backing ring 761 and cylindrical surface of axle 714. Backing ring 761 and locking ring 771 are typically comprised of steel, and resilient ring 781 is typically comprised of a suitable polymer, such as polypropylene.

Figure 10:
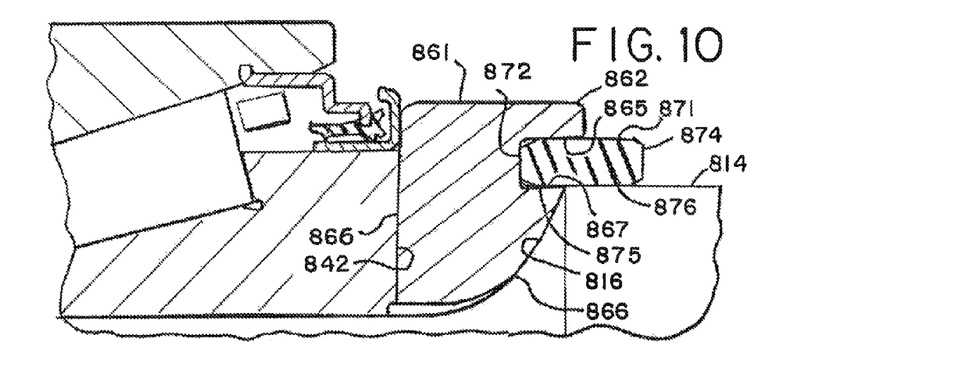
FIG. 10 is an enlarged sectional view of a ninth embodiment of the backing ring assembly of the present invention.

Referring now to FIG. 10, a ninth embodiment of the backing ring assembly of the present invention is shown. Components with identical reference numerals to FIGS. 1 and 2 will not be described.

Backing ring 861 is shown as a generally cylindrical, ring shape structure having a laterally outward face 866 that is adjacent laterally inward flat face 842 of bearing cone 840. Backing ring 861 further comprises a laterally inwardly curved face 866 which is adjacent fillet 816 of axle 814 backing ring 861 also includes a radially outer section 862 which forms, with radial surface 867, cutout section 865 of backing ring 861.

Resilient locking ring 871 is seen as a cylindrical ring shaped structure having a laterally inner end 874 and a laterally outer end 872. Laterally outer end 872 is received into a cutout section 865 of backing ring 861. Laterally inward end 874 of locking ring 871 is seen to include an inner radially facing 876 surface that is adjacent axle 814. Laterally outward end 872 of locking ring 871 is seen to have an radially inward facing section 875 which is adjacent a radially outward facing section 867 of backing ring 861. Backing ring 861 is typically comprised of steel, while resilient locking ring 871 is typically comprised of a suitable polymer such as polypropylene.

Figure 11:
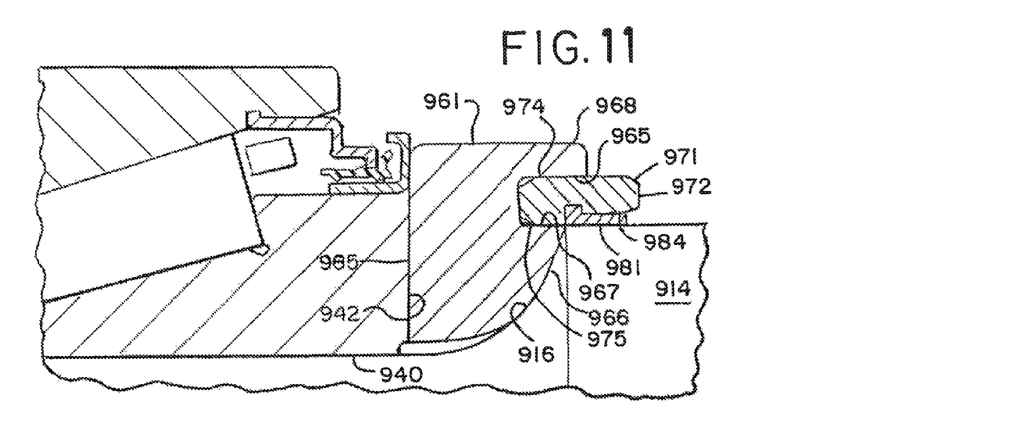
FIG. 11 is an enlarged sectional view of a tenth embodiment of the backing ring assembly of the present invention.

Referring now to FIG. 11, a tenth embodiment of the backing ring assembly of the present invention is shown. Components with identical reference numerals to FIGS. 1 and 2 will not be described.

Backing ring 961 is shown as a generally cylindrical, ring shape structure having a laterally flat outward face 985 that is adjacent laterally inward flat face 942 of bearing cone 940. Backing ring 961 further comprises a laterally inward curved face 966 which is adjacent fillet 916 of axle 914. Locking ring 971 includes an laterally outward section 974 that extends into cutout section 965 of backing ring 961. Locking ring 971 also includes a lateral inward end 972 that itself includes a recessed section 984 at the lateral inner facing surface thereof. Resilient ring 981 is fit into recessed section 984 of locking ring 971 and contacts axle 914. Backing ring 961 includes a radially outward projecting portion 968 which with radial surface 967, forms cutout section 965. Locking ring lateral outer section 974 includes an inner radial surface 975 that is adjacent radial surface 967 of backing ring 961. Backing ring 961 and locking ring 971 are typically comprised of steel, and resilient ring 981 is typically comprised of a suitable polymer, such as polypropylene.

Figure 12:
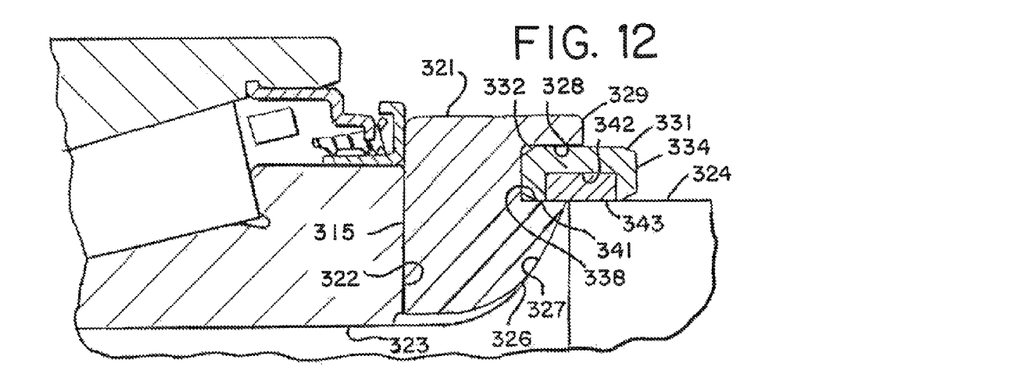
FIG. 12 is an enlarged sectional of an eleventh embodiment of the backing ring assembly of the present invention.

Referring now to FIG. 12, an eleventh embodiment of the backing ring assembly of the present invention is set forth. Components with identical reference numerals to FIGS. 1 and 2 will not be describe.

Backing ring 321 is shown as generally cylindrical, ring shape structure having a laterally outward face 325 that is adjacent laterally inward flat face 322 of bearing cone 323. Backing ring 321 further comprises a laterally inward curved face 326 which is adjacent fillet 327 of axle shaft 324. Locking ring 331 is seen as a cylindrical ring shape structure having a laterally inward end 334 and a laterally outer end 332. Laterally outer end 332 extends into cutout section 328 of backing ring 321. Backing ring 321 includes a radially outward projecting portion 329 which with radial outer surface 338 forms cutout section 328. Locking ring lateral outer end 332 includes an inner radial surface 341 that is adjacent radial outer surface 338 of backing ring 321. Locking ring 331 includes a radially inward recess 342 between laterally inward end 334 and laterally outer end 332. Resilient ring 343 is fit in recess 342 and has a radially inward surface adjacent radial outer surface 338 of backing ring 321 and axle surface 324. Backing ring 321 and locking ring 331 are typically comprised of steel, and resilient ring 343 is comprised of a suitable polymer such as polypropylene.

Figure 13:
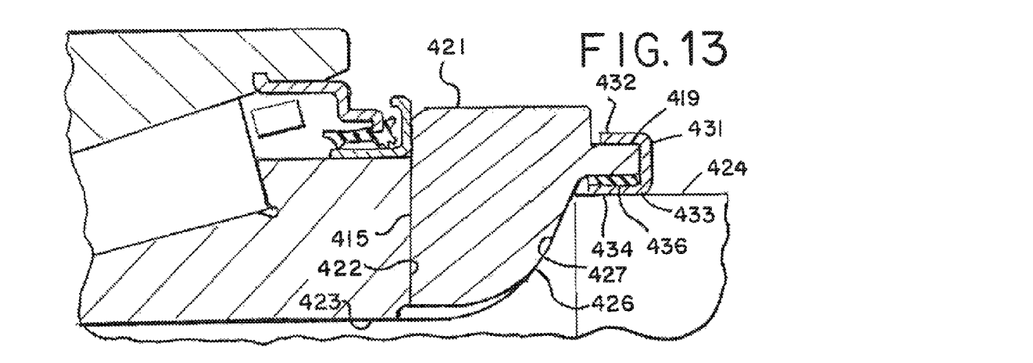
FIG. 13 is an enlarged sectional view of a twelfth embodiment of the backing ring assembly of the present invention.

Referring now to FIG. 13, a twelfth embodiment of the present invention is shown. Components with identical reference numerals to FIGS. 1 and 2 will not be described.

Backing ring 421 is seen to comprise a generally ring shaped structure having laterally outward facing wall 415, adjacent laterally inner facing wall 422 of bearing cone 423. Backing ring 421 is seen to have a curved section 426 which is adjacent fillet section 427 of axle 424. Backing ring also includes a lateral inward extending section 419. Locking ring 431 is seen to comprise a generally cylindrical ring shaped structure having a radial outer section 432 and a radial inner section 433. Radial inner section 433 includes a radial inward surface 434 that is adjacent axle 424. Resilienting 436 is located between radial inward section 433 of locking ring 431 and lateral inward extending section 419 of backing ring 421. Backing ring 421 and locking ring 431 are typically comprised of steel, and resilient ring 436 is typically comprised of a suitable polymer such as polypropylene.

Figure 14:
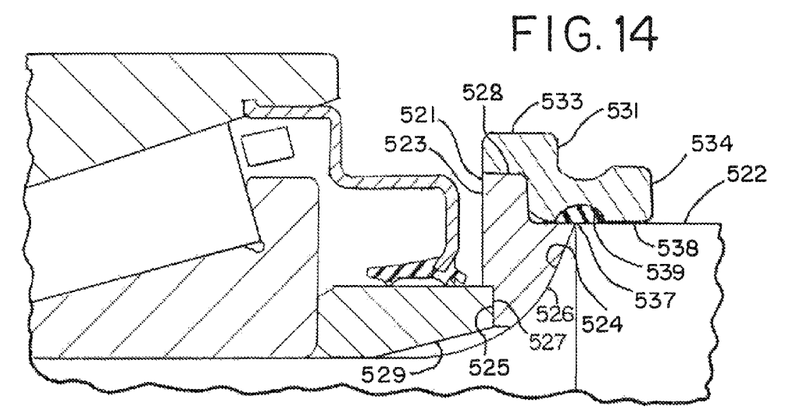
FIG. 14 is an enlarged sectional view of a thirteenth embodiment of the backing ring assembly of the present invention.

Referring now to FIG. 14 a thirteenth embodiment of the backing ring assembly of the present invention is shown. Components with identical reference numerals to FIGS. 1 and 2 will not be described.

Backing ring 521 is seen to comprise a generally cylindrical ring shaped structure wall having a. laterally outward facing wall 523 that includes recess 525 that receives a lateral inner edge 527 of wear ring 529. Backing ring 521 is also seen to comprise a curved section 526 which is adjacent curved fillet 524 of axle 522. Backing ring 521 is also seen to comprise a radially extending section 528 that extends beyond the radial extent of cylindrical surface axle 522.

Locking ring 531 is seen to comprise a ring generally ring shaped structure having a laterally inward facing section 534. Laterally inward section 534 includes a radially inward section 538 that is adjacent cylindrical surface of axle 522. Locking ring 531 is also seen to include a laterally and radially outward extending section 533 that is adjacent backing ring radially extending section 528. Locking ring 531 is also seen to comprise a. laterally centrally located inwardly radially facing cutout section 539 that is adjacent radially outer facing surface of axle 522. A resilient ring 537 is located in cutout section 539. Backing ring 521 and locking ring 531 are typically comprised of steel, and resilient ring 537 is comprised of a polymer such as polypropylene.

Figure 15:
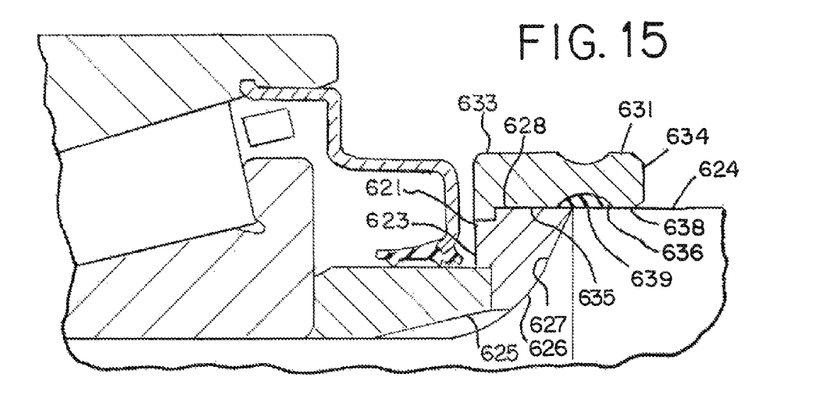
FIG. 15 is an enlarged sectional view of a fourteenth embodiment of the backing ring assembly of the present invention.

Referring now to FIG. 15, a fourteenth embodiment of the present invention is shown. Components with identical reference numerals to FIGS. 1 and 2 will not be described.

Backing ring 621 is seen to comprise a generally cylindrical, ring shaped structure having a laterally outer facing flat surface 623 which is adjacent and includes an indented corner to received a laterally inward facing corner of wear ring 625. Backing ring 621 also is seen to comprise a curved surface 626 which is adjacent fillet 627 of axle 624. Backing ring 621 also includes a radially outer facing surface 628 which is adjacent a complementary radially inner facing surface 635 of locking ring 631.

Locking ring 631 is seen to comprise generally ring like structure having a laterally inner end 634. Laterally inner end 634 is seen to include a radially inner facing surface 638 which is adjacent cylindrical surface axle 624. Locking ring 631 is also seen to comprise a laterally outer end 633 which includes a radially inner surface 635 which is adjacent radially outer facing surface 628 of backing ring 621. Locking ring 631 also is seen to include a radially inner facing recess 636 which receives a resilient ring 639. Resilient ring 639 contacts radially outer facing surface 628 of backing ring 621 and axle 624. Backing ring 621 and locking ring 631 are typically comprised of steel, and resilient ring 639 is typically comprised of a polymer such as polypropylene.

Figure 16:
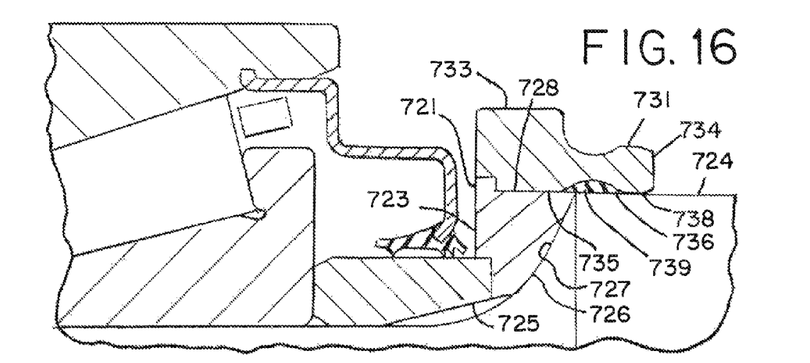
FIG. 16 is an enlarged sectional view of a fifteenth embodiment of the backing ring assembly of the present invention.

Referring now to FIG. 16, an fifteenth embodiment of the backing ring assembly of the present invention is shown. Components with identical reference numerals to FIGS. 1 and 2 will not be described.

Backing ring 721 is seen to comprise a generally cylindrical, ring structure. Backing ring 721 includes a laterally outwardly facing flat face 723 which is adjacent and includes an indented corner to receive laterally inward facing corner of wear ring 725. Backing ring 721 also includes a curved generally inwardly facing surface 726 which is adjacent complementary generally curved fillet 727 of axle 724. Backing ring 721 is also seen to include a radially outer facing surface 728 which is adjacent complementary inner facing surface 735 of locking ring 731.

Locking ring 731 is seen to comprise a generally cylindrical ring like structure having laterally inward end 734. Laterally inward end 734 is seen to include a radially inner facing surface 738 which is adjacent cylindrical surface of axle 724. Locking ring 771 is also seen to comprise a laterally outward end 733 which includes a radially inward surface 735 which engages radial outer facing surface 728 of backing ring 721. Locking ring 731 is also seen to include a radially inner facing recess 736 which receives resilient ring 739. Resilient ring 739 contacts radially outer facing surface 728 of backing ring 721 and axle 724. Backing ring 721 and locking ring 731 are typically comprised of steel, and resilient ring 739 is typically comprised of a suitable polymer such as polypropylene.

Figure 17:
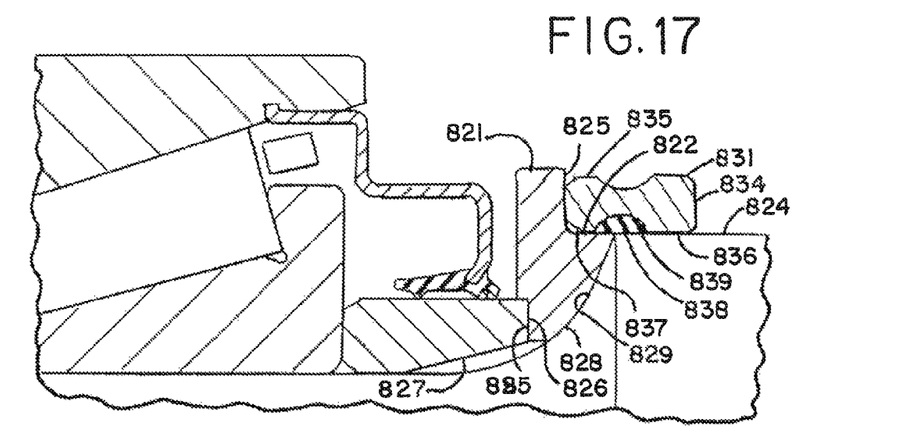
FIG. 17 is an enlarged sectional view of a sixteenth embodiment of the backing ring assembly of the present invention.

Referring now to FIG. 17, a sixteenth embodiment of the backing ring assembly of the present invention is shown, Components with identical reference numerals to FIGS. 1 and 2 will not be described.

Backing ring 821 is shown as a generally cylindrical, ring shape structure having a laterally outward face that comprises a cutout section 885, into which the lateral inward edge 826 of wear ring 827 is fit. Backing ring 821 further comprises a laterally inwardly curved face 828 which is adjacent fillet 829 of axle shaft 824. Locking ring 831 is seen as cylindrical ring shaped structure having a laterally inner end 834 and a laterally outer end 835. Laterally outer end 835 is received into a corresponding radial inward facing cutout section 825 of backing ring 821. Laterally inward end 834 of locking ring 831 is seen to include an inner radially facing 836 surface that is adjacent cylindrical surface of axle 824. Laterally outward end 835 of locking ring 831 is seen to have an radially inward facing section 837 which is adjacent a radially outward facing section 822 of backing ring 821. Locking ring 831 also includes a radially inner recess 838 which receives resilient ring 839. Resilient ring 839 contacts outer facing surface 822 of backing ring 821 and axle 824. Backing ring 821 and locking ring 831 are typically comprised of steel, and resilient ring 839 is typically comprised of a suitable polymer such as polypropylene.

Figure 18:
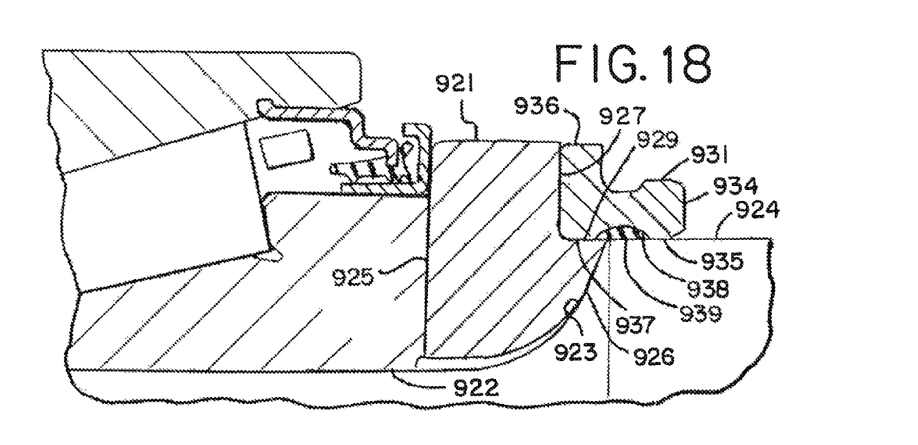
FIG. 18 is an enlarged sectional view of a seventeenth embodiment of the backing ring assembly of the present invention.

Referring now to FIG. 18, a seventeenth embodiment of the backing ring assembly of the present invention is shown. Components with identical reference numerals to FIGS. 1 and 2 will not be described.

Backing ring 921 is shown as a generally cylindrical, ring shape structure having a laterally outward face 925 that is adjacent bearing cone 922. Backing ring 921 further comprises a laterally inward curved face 926 which is adjacent fillet 923 of axle 924. Locking ring 931 includes an laterally inward facing section 934 that includes an inner radial facing surface 935 that is adjacent axle 924. Locking ring 931 also includes a radially extended lateral outward end 936 that is adjacent a radially extended lateral flat face of backing ring 921. Locking ring lateral outer end 936 includes an inner radial surface 937 that is adjacent radial outer surface 929 of backing ring 921. Locking ring 931 also includes a radially inner recess 938 which receives resilient ring 939. Resilient ring 939 contacts outer facing surface 929 of backing ring 921 and axle 924. Backing ring 921 and locking ring 931 are typically comprised of steel, and resilient ring 939 is typically comprised of a suitable polymer such as polypropylene.

Figure 19:
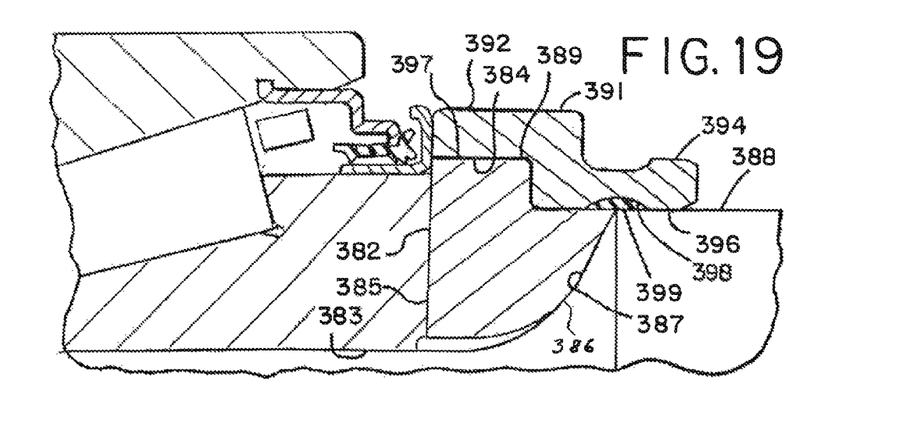
FIG. 19 is an enlarged sectional view of an eighteenth embodiment of the backing ring assembly of the present invention.

Referring now to FIG. 19 an eighteenth embodiment of the backing ring assembly of the present invention is set forth. Components with identical reference numerals to FIGS. 1 and 2 will not be described.

Backing ring 382 is shown as generally cylindrical, ring shape structure having a laterally outward face 385 that is adjacent bearing cone 383. Backing ring 382 further comprises a laterally inward curved face 386 which is adjacent fillet 387 of axle 388. Locking ring 391 is seen as a cylindrical ring shape structure having a laterally inward end 394 and a laterally outer end 392. Laterally outer end 392 of locking ring 391 includes a radial inner flat surface 384 that is received against a corresponding radial outer facing section 389 of backing ring 382. Laterally inward end 394 of locking ring 391 is seen to have a radially inner surface 396 adjacent axle 388. Laterally outward end 392 of locking ring 391 is seen to be of a radial extended dimension which is adjacent a radially extended outer surface 397 of backing ring 382. Locking ring 391 also includes a radially inner recess 398 which receives resilient ring 399. Resilient ring 399 contacts extended outer surface 397 of backing ring 382 and axle 388. Backing ring 382 and locking ring 391 are typically comprised of steel, and resilient ring 399 is typically comprised of a suitable polymer such as polypropylene.

What is claimed is:

1. A bearing assembly comprising
an axle having
an end section of a first diameter, a journal at the axle end section,
a shoulder adjacent the journal, and a second larger diameter axle section adjacent the shoulder,
a bearing assembly placed around the journal,
a bearing end cap affixed to the axle end section to secure the bearing assembly on the journal,
the bearing assembly comprising:
a backing ring adjacent the axle shoulder, the backing ring including a laterally inward facing cutout,
a locking ring having a laterally inward section and a laterally outward section, and an indented section between the inward section and the outward section,
and a resilient ring located in the indented section of the locking ring,
the resilient ring having radially inward facing surface contacting the backing ring,
wherein the outward section of the locking ring is received in the cutout of the backing ring, wherein the radially inward facing surface of the resilient ring contacts the second larger diameter axle section.

2. The bearing assembly of claim 1
further comprising a wear ring,
the wear ring having an inner radial surface adjacent the journal,
and an inner lateral edge,
the backing ring having an inner radial cutout section,
the inner radial edge of the wear ring received in the inner radial cutout section of the backing ring.

* * * * *